United States Patent
Xiang

(10) Patent No.: US 10,193,364 B2
(45) Date of Patent: Jan. 29, 2019

(54) ELECTRONIC CIGARETTE AND METHOD FOR REMINDING CHARGING THEREIN

(71) Applicant: Shenzhen Kimsen Technology Co., Ltd, Shenzhen, Guangdong (CN)

(72) Inventor: Zhiyong Xiang, Guangdong (CN)

(73) Assignee: Shenzhen Kimsen Technology Co., Ltd, Shenzhen (CN)

( * ) Notice: Subject to any disclaimer, the term of this patent is extended or adjusted under 35 U.S.C. 154(b) by 53 days.

(21) Appl. No.: 15/306,502

(22) PCT Filed: Apr. 25, 2014

(86) PCT No.: PCT/CN2014/076196
§ 371 (c)(1),
(2) Date: Oct. 25, 2016

(87) PCT Pub. No.: WO2015/161502
PCT Pub. Date: Oct. 29, 2015

(65) Prior Publication Data
US 2017/0047756 A1 Feb. 16, 2017

(51) Int. Cl.
*H02J 7/00* (2006.01)
*A24F 47/00* (2006.01)
*A24F 11/00* (2006.01)

(52) U.S. Cl.
CPC ............ *H02J 7/0047* (2013.01); *A24F 11/00* (2013.01); *A24F 47/00* (2013.01); *A24F 47/008* (2013.01);
(Continued)

(58) Field of Classification Search
CPC ...... A24F 47/00; A24F 47/008; H02J 7/0047; A61M 15/0013
(Continued)

(56) References Cited

U.S. PATENT DOCUMENTS

2014/0209105 A1* 7/2014 Sears .................. F22B 1/28
131/328
2014/0299138 A1* 10/2014 Xiang ................... G06Q 10/00
131/329

(Continued)

FOREIGN PATENT DOCUMENTS

CN 102913628 A 2/2013
CN 103107376 A * 5/2013 ............. A24F 47/00

OTHER PUBLICATIONS

International Search Report of PCT Patent Application No. PCT/CN2014/016196 dated Jan. 23, 2015.

*Primary Examiner* — Abdullah A Riyami
*Assistant Examiner* — Thang H. Nguyen

(57) ABSTRACT

The invention is related to an electronic cigarette and a method for reminding of charging of an electronic cigarette. The electronic cigarette comprises: a microcontroller, a charging prompt module, a power detection module and a power supply battery, wherein the power detection module is configured for detecting the remaining capacity of the power supply battery and sending the value of the remaining capacity to the microcontroller, the microcontroller is configured for comparing the received value of remaining capacity with a preset value, and controlling the charging prompt module to send a charging prompt signal when the value of the remaining capacity is lower than the preset value. The beneficial effects are to remind a user of insufficient remaining capacity of a power supply battery in time, to effectively avoid the situation where a user cannot use an electronic cigarette due to the power supply battery is used up.

8 Claims, 6 Drawing Sheets

(52) U.S. Cl.
CPC .......... *H02J 7/0045* (2013.01); *H02J 7/0052* (2013.01); *H02J 2007/005* (2013.01)

(58) Field of Classification Search
USPC .......................................................... 131/328
See application file for complete search history.

(56) References Cited

U.S. PATENT DOCUMENTS

| | | | |
|---|---|---|---|
| 2014/0299141 A1* | 10/2014 | Flick .................... | H05B 1/0202 131/329 |
| 2015/0196053 A1* | 7/2015 | Liu ........................ | A24F 15/18 340/10.4 |
| 2015/0305410 A1* | 10/2015 | Liu ....................... | A24F 47/008 131/329 |
| 2015/0313284 A1* | 11/2015 | Liu ....................... | A24F 47/008 131/329 |
| 2017/0360097 A1* | 12/2017 | Xiang .................... | A24F 47/00 |

\* cited by examiner

ELECTRONIC CIGARETTE AND METHOD FOR REMINDING CHARGING THEREIN

FIELD OF THE INVENTION

The present invention related to electronic cigarette technology, and more particularly, to an electronic cigarette and a method for reminding of charging of an electronic cigarette.

BACKGROUND OF THE INVENTION

The electronic cigarettes in the prior art do not have the function of reminding the user to charge automatically, if the user does not timely charge when using an electronic cigarette, it is possible that there are defects with the situation where the user cannot use an electronic cigarette due to the fact that the power capacity of a power supply battery thereof is used up. Therefore, the electronic cigarette in the prior art brings enormous inconvenience to the user.

SUMMARY OF THE INVENTION

The object of the present invention is to provide an electronic cigarette and a method for reminding of charging of an electronic cigarette, aiming at the drawback that the electronic cigarette is unable to remind of charging.

The technical solutions of the present application for solving the technical problems are as follows: designing an electronic cigarette, comprising: a microcontroller, a charging prompt module, a power detection module and a power supply battery;

the power detection module is configured for detecting remaining capacity of the power supply battery, and sending a value of the remaining capacity to the microcontroller;

the microcontroller is configured for comparing the value of with a preset value in the microcontroller, and controlling the charging prompt module to send out a charging prompt signal when the value of the remaining capacity is lower than the preset value.

Preferably, the microcontroller is further configured for controlling the charging prompt module to prompt the number of puffs supplied by the remaining capacity when the value of the remaining capacity is lower than the preset value.

Preferably, the charging prompt module comprises at least one of the followings: a displaying prompt element, an airflow control element and a sound prompt element.

Preferably, the charging prompt module comprises the airflow control element.

When the value of the remaining capacity is lower than the preset value, and a smoking signal has been received, the microcontroller is further configured for controlling the airflow control element to open or close an airflow channel with preset frequency, to send out an airflow charging prompt signal.

Preferably, the airflow control element comprises: an elastic cylinder and an electromagnet.

when the value of the remaining capacity is lower than the preset value, and the smoking signal has been received, the microcontroller supplies power to the electromagnet according to an preset electrifying period, the electromagnet attracts the elastic cylinder by producing magnetic force, to make the airflow control element open or close the airflow channel with the preset frequency to transmit the airflow charging prompt signal.

Preferably, the electronic cigarette comprises an electronic cigarette body, a fixed sleeve arranged on the electronic cigarette body, an axial through hole and a first radial mounting position as well as a second radial mounting position communicated with the axial through hole respectively and arranged correspondingly are defined in the fixed sleeve, the elastic cylinder is arranged movably in the first radial mounting position, and the electromagnet is arranged in the second radial mounting position.

Preferably, the axial through hole forms the airflow channel;

the elastic cylinder comprises an abutting part arranged in the first radial mounting position and configured for closing or opening the airflow channel, and a spring configured for supplying elastic force to the abutting part to reposit the abutting part;

when the microcontroller supplies power to the electromagnet, the electromagnet attracts the abutting part, the abutting part moves towards the electromagnet and abuts the electromagnet to close the airflow channel;

when the microcontroller disconnects the power to the electromagnet, the abutting part moves towards the opposite to the electromagnet and is repositted to open the airflow channel.

Preferably, the charging prompt module comprises a displaying prompt element;

when the value of the remaining capacity is lower than the preset value, the microcontroller is configured for controlling the displaying prompt element to send out a light charging prompt signal.

Preferably, the displaying prompt element is arranged on one end opposite to smoking end of the electronic cigarette.

Preferably, a lamp configured for imitating burning of tobacco when smoking and at the same time used as the displaying prompt element is arranged on one end opposite to smoking end of the electronic cigarette.

Preferably, the displaying prompt element comprises at least two LEDs, and each of the two LEDs is configured for displaying different emitting color.

Preferably, the charging prompt module comprises a sound prompt element;

when the value of the remaining capacity is lower than the preset value, the microcontroller is configured for controlling the sound prompt element to send out a sound charging prompt signal.

Preferably, the power detection module is the DS2762chip U1, made by Maxim Integrated Products, Inc., in California, United State;

wherein the seventh pin of U1 is connected with the microcontroller; the sixteenth pin of U1 is connected with the power supply battery through a resistance R5; the fifteenth pin of U1 is connected with the power supply battery through a resistance R6.

Preferably, the power detection module is the FAN4010 chip U2, made by Shenzhen Sen Chuangli Trading Co., Ltd., in Guangdong Province, China;

wherein the fourth pin of U2 is connected with the power supply battery; the third pin of U2 is connected with the microcontroller; the fifth pin of U2 is connected with the power supply battery through a resistance R13.

A method for reminding charging for an electronic cigarette, comprising following steps:

detecting remaining capacity of a power supply battery, and sending a value of the remaining capacity to a microcontroller by a power detection module;

comparing the received value with a preset value in the microcontroller, and controlling the charging prompt module to send out a charging prompt signal by the microcontroller when the value is lower than the preset value.

Preferably, the charging prompt signal comprises at least one of the followings: a light charging prompt signal, an airflow charging prompt signal and a voice charging prompt signal.

Preferably, the charging prompt signal comprises an airflow charging prompt signal;

the airflow charging prompt signal is transmitted by following way:

when the value of the remaining capacity is lower than the preset value, and a smoking signal has been received, opening or closing the airflow channel with an preset frequency, to send out the airflow charging prompt signal;

wherein the method of opening or closing the airflow channel with the preset frequency comprises:

supplying power to an electromagnet according to the preset frequency, the electromagnet is energized and producing magnetic force to attract an elastic cylinder fitted with the electromagnet, to open or close the airflow channel of the electronic cigarette with the preset frequency.

Preferably, when the value of the remaining capacity is lower than the preset value, the microcontroller further controls the charging prompt module to prompt the number of remaining puffs supplied by the remaining capacity Preferably, a lamp imitates burning of tobacco when smoking and at the same time uses as the displaying prompt element, the lamp is arranged on one end opposite to smoking end of the electronic cigarette.

When the microcontroller detects a smoking action, the microcontroller controls the lamp to glow continuously for a period of time, meanwhile compares the value of the remaining capacity with the preset value in the microcontroller; when the value is lower than the preset value, the microcontroller controls the lamp to glow flickeringly or emit a light of different color when smoking.

Preferably, when the microcontroller detects a smoking action, then the microcontroller compares the value of the remaining capacity with the preset value.

The present invention of electronic cigarette and method for reminding charging for an electronic cigarette, has the following beneficial effects: can remind a user of insufficient remaining capacity of a power supply battery by using airflow, light and sound in time, to make it easy for a user to replace a power supply battery or charge same in time and to effectively avoid the situation where a user cannot use an electronic cigarette due to the fact that the power capacity of a power supply battery thereof is used up; can give a user intuitive prompt by quantizing the remaining number of puffs, to help a user reasonably arrange electronic cigarette charging; can achieve intelligent reminding; can reduce the cost through a lamp used for imitating the burning of tobacco and at the same time used as the displaying prompt element; it is favorable for prompting a user when arranging the displaying prompt element on one end opposite to the smoking end of the electronic cigarette; and can timely prompt a user the supply battery is fully charged when charging by using light and sound.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments.

Figure 1:
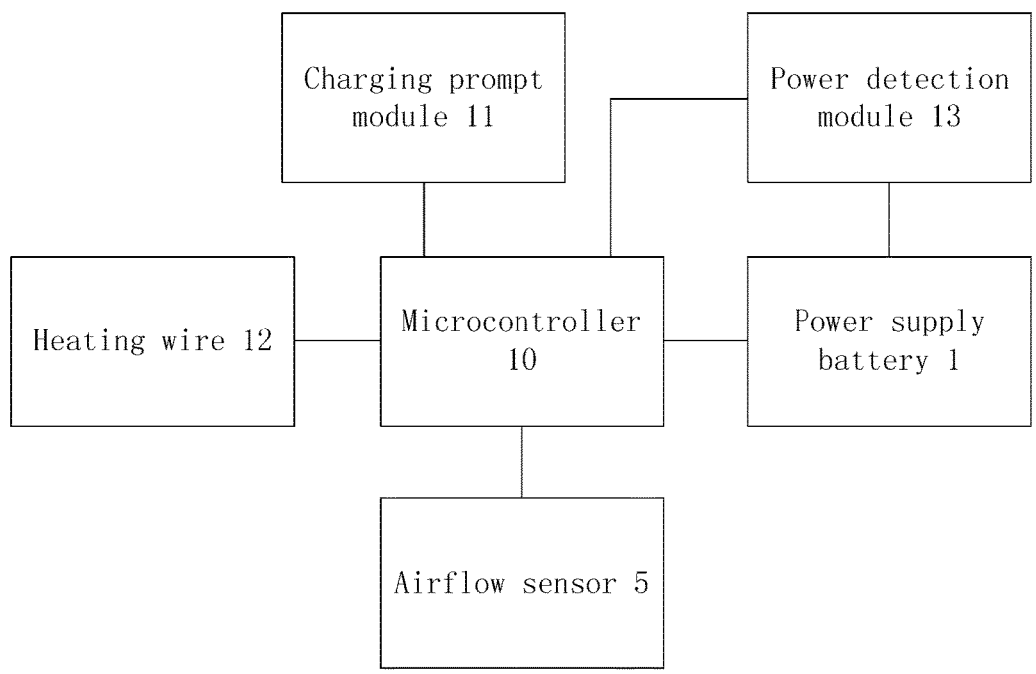
FIG. 1 is a structure block diagram of an electronic cigarette in embodiments of present invention.

FIG. 1 is a structure block diagram of an electronic cigarette in embodiments of present invention. The electronic cigarette in embodiments of present invention comprises: a microcontroller 10, a charging prompt module 11, a power detection module 13 and a power supply battery 1; the power detection module 13 is configured for detecting the remaining capacity of the power supply battery 1, and sending the value of the remaining capacity to the microcontroller 10; the microcontroller 10 is configured for comparing the value of the remaining capacity with a preset value in the microcontroller, and controlling the charging prompt module 11 to send out a charging prompt signal when the value of the remaining capacity is lower than the preset value.

In the embodiments of present invention, the microcontroller 10 is further configured for controlling the charging prompt module 11 to prompt the number of remaining puffs supplied by the remaining capacity when the value of the remaining capacity is lower than the preset value. Specifically, assume that the capacity of the power supply battery is a (Ah), each continuous smoking time of user is s (second), each time the consumption of electricity is b (Ah), then devide the remaining power value by the each continuous smoking time of user and the consumption of electricity each time to get the number of remaining puffs supplied by the remaining capacity. Thus, by quantifying the number of remaining puffs, the user can get more intuitive prompt, which can help the user to arrange reasonably to charge the electronic cigarette.

In addition, the electronic cigarette in embodiments of present invention further comprises a heating wire 12 and an airflow sensor 5 and so on. The heating wire 12 and an airflow sensor 5 are both connected with the microcontroller 10. The airflow sensor 5 detects the smoking signal, and sends it to the microcontroller 10; the microcontroller 10 controls the power supply circuit to be in communication according to the smoking signal to supply power to the heating wire 12, to heat it to atomize the tobacco juice.

In the embodiments of present invention, the charging prompt module 11 comprises at least one of the followings: a displaying prompt element, an airflow control element and a sound prompt element. The displaying prompt element comprises at least two LEDs, to send out a light prompt signal. The sound prompt element can comprise a loudspeaker and so on, to send out a sound prompt signal. The airflow control element will be described in the follow-up embodiments. That is the charging prompt module 11 in this embodiment is consisted of one or more of the displaying prompt element, the airflow control element and the sound prompt element. When the value of the remaining capacity is lower than the preset value, the microcontroller 10 controls the displaying prompt element to send out a light charging prompt signal. When the value of the remaining capacity is lower than the preset value, the microcontroller 10 controls the sound prompt element to send out a sound charging prompt signal. when the value of the remaining capacity is lower than the preset value, and the smoking signal has been received, the microcontroller 10 controls the airflow control element to open or close the airflow channel with preset frequency, to send out an airflow charging prompt signal.

In a preferable embodiment of present invention, the displaying prompt element is arranged on one end opposite to the smoking end of the electronic cigarette. As the end opposite to the smoking end of the electronic cigarette is an area concerned by smokers generally, so it is easy to be noticed to arrange the displaying prompt element on the end, it's benefit for reminding the users.

In another preferable embodiment of present invention, a lamp configured for imitating burning of tobacco when smoking and at the same time used as the displaying prompt element is arranged on the end opposite to the smoking end of the electronic cigarette. Thus, one lamp is with multiple functions, which makes the whole structure of the electronic cigarette concise.

Figure 2:
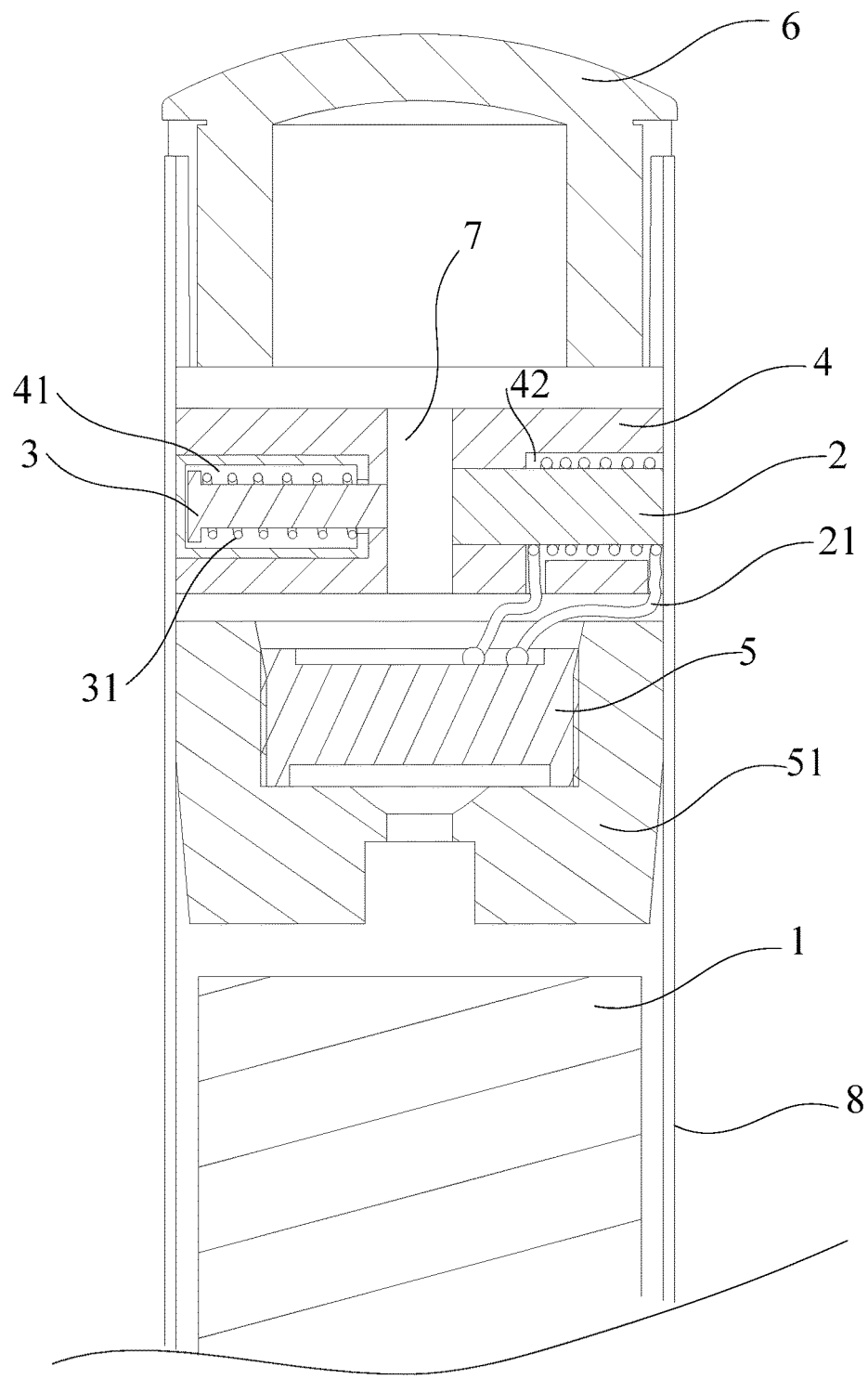
FIG. 2 is a structure diagram of an electronic cigarette in embodiments of present invention.

See FIG. 2, the airflow control element comprises an elastic cylinder and an electromagnet. With the combination of FIG. 2 as following, to describe the location of the elastic cylinder and the electromagnet in detail.

In the embodiments of present invention, the electronic cigarette comprises an electronic cigarette body 8, a fixed sleeve 4 arranged on the electronic cigarette body 8, an axial through hole 7 and a first radial mounting position 41 as well as a second radial mounting position 42 communicated with the axial through hole 7 respectively and arranged correspondingly are defined in the fixed sleeve 4, the elastic cylinder is arranged movably in the first radial mounting position 41, the electromagnet is arranged in the second radial mounting position 42. The axial through hole 7 forms the airflow channel.

Wherein, the electromagnet comprises an iron core 2 arranged in the second radial mounting position 42 and an electronic wire 21 arranged on the iron core 2, the electronic wire 21 is connected with the microcontroller 10 (this connection relationship is not shown in figure). The elastic cylinder comprises an abutting part 3 arranged in the first radial mounting position 41 configured for closing or opening the airflow channel, and a spring 31 configured for supplying elastic force to the abutting part 3 to reposit the abutting part 3. The abutting part 3 is made of magnetic materials. When the microcontroller 10 supplies power to the electromagnet, the electromagnet attracts the abutting part 3, the abutting part 3 moves towards the electromagnet and abuts the electromagnet to close the airflow channel.

Figure 3:
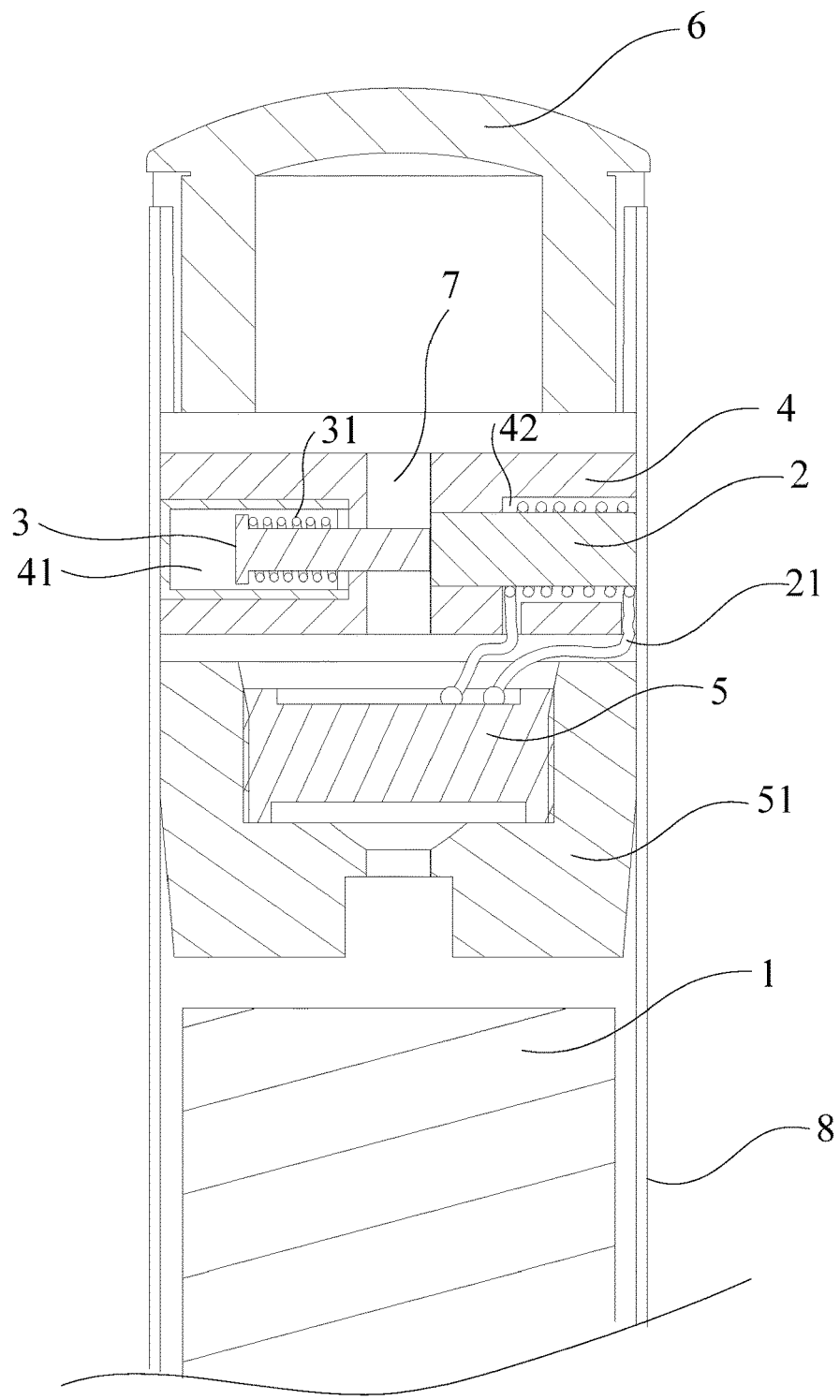
FIG. 3 is a structure diagram of an electronic cigarette in embodiments of present invention.

See FIG. 3, when the value of the remaining capacity is lower than the preset value, and the smoking signal has been received, the microcontroller 10 supplies power to the electromagnet. The electromagnet is energized and producing magnetic force to attract the abutting part 3, the abutting part 3 moves towards the electromagnet and abuts the electromagnet to close the airflow channel. When the microcontroller disconnects the power to the electromagnet, the abutting part 3 moves towards the opposite to the electromagnet and is repositted to open the airflow channel. Preferably, in the embodiments of present invention, the microcontroller 10 supplies power to the electromagnet according to the electrifying period, to make the abutting part 3 be attracted periodically to block the airflow channel, thus the airflow channel is opened or closed periodically with preset frequency. Preferably, assume that each smoking time of user is 3 (second), then set that supplying power to the electromagnet for 0.1 seconds every other 0.5 seconds (that is the preset electrifying period is: disconnecting the power for 0.1 seconds after being energized for 0.5 seconds), that is during the smoking process, the airflow of the electronic cigarette will be closed every 0.5 seconds, and the closing time is 0.1 seconds (the airflow opens or closes with a preset frequency of 0.6 seconds, wherein the opened time is 0.1 seconds, the closed time is 0.5 seconds). Thus, when smoking, the user can feel smoking not freely (only when the airflow channel is opened the user can smoke normally), thus to play the role of reminding the user to charge the electronic cigarette in time.

In FIG. 2 and FIG. 3, 1 is a battery of the cigarette, 5 is an airflow sensor (integrated microphone), 51 is an integrated microphone base, 6 is a lamp cap. In addition, the electronic cigarette further comprises an atomizing assembly (including a suction nozzle, an oil storage cotton, an atomizing base and a heating wire and so on), not shown in FIG. 2 and FIG. 3, the specific structure of the atomizing assembly and the connection with the battery assembly are not the point of present invention, so the detail is not described.

Figure 4:
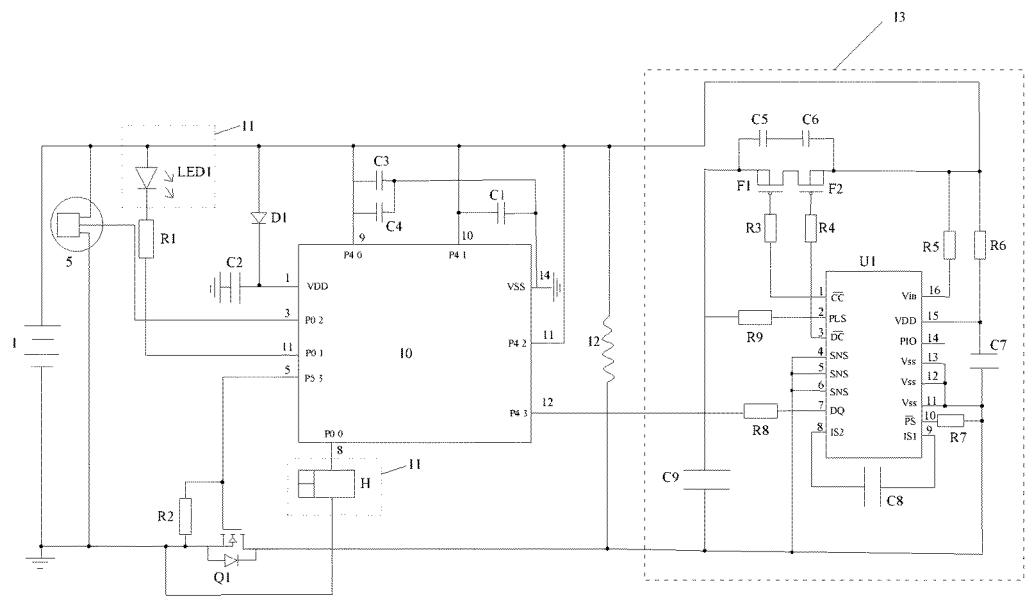
FIG. 4 is a circuit diagram of an electronic cigarette in a first embodiment of present invention.

FIG. 4 is a circuit diagram of an electronic cigarette of present invention. In a first embodiment of present invention, the charging prompt module 11 comprises a displaying prompt element and an airflow control element. Wherein, the airflow control element just shows an electromagnet H connected with the microcontroller 10, the displaying prompt element comprises a light emitting diode LED1. The model of the microcontroller 10 is SN8P2711B, the power detection module 13 is the DS2762 chip U1, the model of the airflow sensor 5 is S087.

The seventh pin of U1 is connected with the microcontroller 10; the sixteenth pin of U1 is connected with the power supply battery 1 through a resistance R5; the fifteenth pin of U1 is connected with the power supply battery 1 through a resistance R6; the eleventh pin of the microcontroller is connected to the negative pole of the LED1 through a resistance R1; the positive pole of the LED1 is connected with a heating wire 12; the eighth pin of the microcontroller 10 is connected with an end of the electronic wire of the electromagnet H, the other end of the electronic wire of the electromagnet H is connected to the ground; the third pin of the microcontroller 10 is connected with the airflow sensor 5, the other two ends of the airflow sensor 5 are connected with the positive pole and negative pole of the power supply battery 1 respectively. In addition, the fifth pin of the microcontroller 10 is connected with the grid of a field-effect tube Q1, the source of the field-effect tube Q1 is connected to the ground, the drain of the field-effect tube Q1 is connected to the one end of the heating wire 12; the other end of the heating wire 12 is connected with the positive pole of the power supply battery 1.

In the first embodiment of present invention, U1 detects the remaining capacity of the power supply battery 1, and transmits the detection result to the microcontroller 10 through the seventh pin. When detecting that the value of the remaining capacity is lower than the preset value, by controlling the output of the eleventh pin, thus the microcontroller 10 makes the light emitting diode LED1 emit light remind the user of charging. In addition, during the smoking process of the user, the light emitting diode LED1 can further emit light to imitate the smoking effect of real cigarettes; when the power supply battery 1 is on a full charge, the light emitting diode LED1 will also emit light to inform the user that the power has been fully charged.

In addition, by controlling the output of the eighth pin, the microcontroller 10 can further make the electromagnet be energized to produce magnetic force to attract the abutting part 3. Preferably, in embodiments of present invention, the third pin of the microcontroller 10 receives the smoke signals detected by the airflow sensor 5, then makes the electromagnet be energized to produce magnetic force by controlling the output of the eighth pin.

Understandably, when the microcontroller 10 receives the smoke signals detected by the airflow sensor 5 through the third pin, then by controlling the output of the fifth pin, it makes the field-effect tube Q1 be energized, thus the power supply battery 1 supplies power to the heating wire 12, the heating wire 12 heats to atomize the tobacco juice.

In embodiments of present invention, if the value of the remaining capacity is lower than the preset value, then by controlling the output voltage of the fifth pin, the microcontroller 10 can realize the controlling of the power supply voltage of the power supply battery 1 to the heating wire 12, thus to realize the controlling of the output power of the heating wire 12, for instance, it can lower the output power when the value of the remaining capacity is lower than the preset value to save electricity.

The preset value of the remaining capacity can be set as ⅓ or ¼ and so on of the full capacity of the power supply battery 1.

In the first embodiment of present invention, when the user is smoking, the airflow sensor detects the smoking signal, and transmits the signal to the microcontroller, the microcontroller receives the smoking signal and controls to make the field-effect tube Q1 be energized, thus to heat the heating wire 12 to atomize the tobacco juice, to realize the function of smoking by the user. The power detection module detects the remaining capacity of the power supply battery 1 and transmits the detection result to the microcontroller 10, when detecting that the value of the remaining capacity is lower than the preset value, the microcontroller 10 controls the switching on or off electricity of the electromagnet, to control the opening or closing of the airflow channel of the electric cigarette, to inform the user to charge or replace the battery in time.

The electronic cigarette in the first embodiment of present invention, when detecting that the value of the remaining capacity is lower than the preset value, the microcontroller 10 transmits an airflow charging prompt signal and a light charging prompt signal by controlling the electromagnet and the light emitting diode LED1, to remind the user to charge or replace the battery in time, to effectively avoid the situation where a user cannot use an electronic cigarette due to the fact that the power capacity of a power supply battery thereof is used up.

Figure 5:
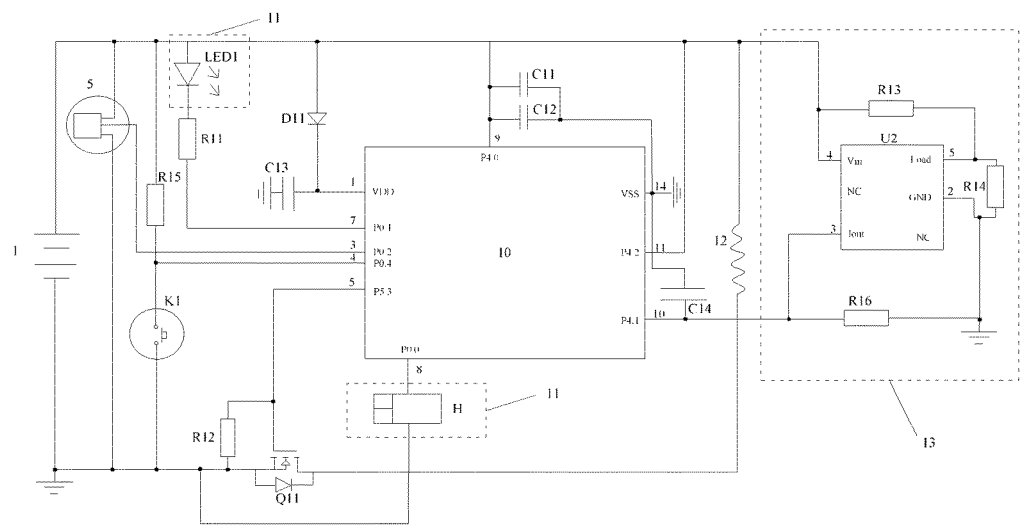
FIG. 5 is a circuit diagram of an electronic cigarette in a second embodiment of present invention.

FIG. 5 is a circuit diagram of an electronic cigarette in a second embodiment of present invention. The electronic cigarette in the second embodiment of present invention adds a setting module on the base of the electronic cigarette in the first embodiment, a key K1. An end of the key K1 is connected with the forth pin of the microcontroller 10 and connected with the positive pole of the power supply battery 1 through a resistance R15, the other end of the key K1 is connected with the negative pole of the power supply battery 1. On the other hand, the electronic cigarette in a second embodiment is realized by replacing the power detection module 13 to the chip U2 (chip FAN4010). Wherein, the forth pin of U2 is connected with the power supply battery 1; the third pin of U2 is connected with the tenth pin of the microcontroller 10, the third pin of U2 is further connected to the ground through a resistance R16; the fifth pin of U2 is connected with the power supply battery 1 through a resistance R13.

Specifically, in the second embodiment of present invention, it can be set as: when the user presses the key K1 for once, the microcontroller 10 detects a key signal once then automatically sets the preset value of the remaining capacity as ¹⁄₁₀ of the capacity of the power supply battery 1, presses the key K1 for twice then sets the preset value as ²⁄₁₀ of the capacity of the power supply battery 1, and so on. Once the key K1 is pressed, the corresponding preset value can be set.

The electronic cigarette in the second embodiment is same with the electronic cigarette in the first embodiment, when detecting that the value of the remaining capacity is lower than the preset value, the microcontroller 10 transmits an airflow charging prompt signal and a light charging prompt signal by controlling the electromagnet and the light emitting diode LED1, to remind the user to charge or replace the battery in time.

Compared with the first embodiment, the electronic cigarette in the second embodiment has a more accurate and concise power detection module 13, and the user can set the power reminding value by the key K1 (that is the preset value of the remaining capacity). Understandably, the key K1 can also be replaced by other methods, for example, replaced by a touch input module and so on.

Figure 6:
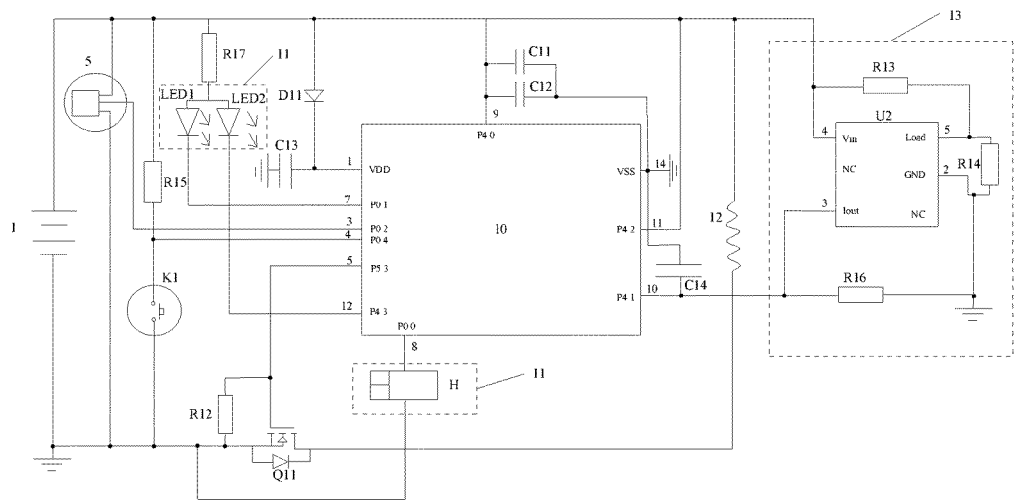
FIG. 6 is a circuit diagram of an electronic cigarette in a third embodiment of present invention.

FIG. 6 is a circuit diagram of an electronic cigarette in a third embodiment of present invention. The electronic cigarette in the third embodiment of present invention adds a light emitting diode LED2 on the base of the electronic cigarette in the second embodiment, thus the light prompt element comprises the light emitting diode LED1 and the light emitting diode LED2. And the color of the emitting light of LED1 and LED2 are different. Thus, when detecting that the value of the remaining capacity is lower than the preset value, the microcontroller 10 can control the light emitting diode LED1 and light emitting diode LED2 to emit a alternately flashing light as a charging prompt signal, in addition the airflow control element sends out an airflow charging prompt signal, to remind the user to charge or replace the battery in time.

Figure 7:
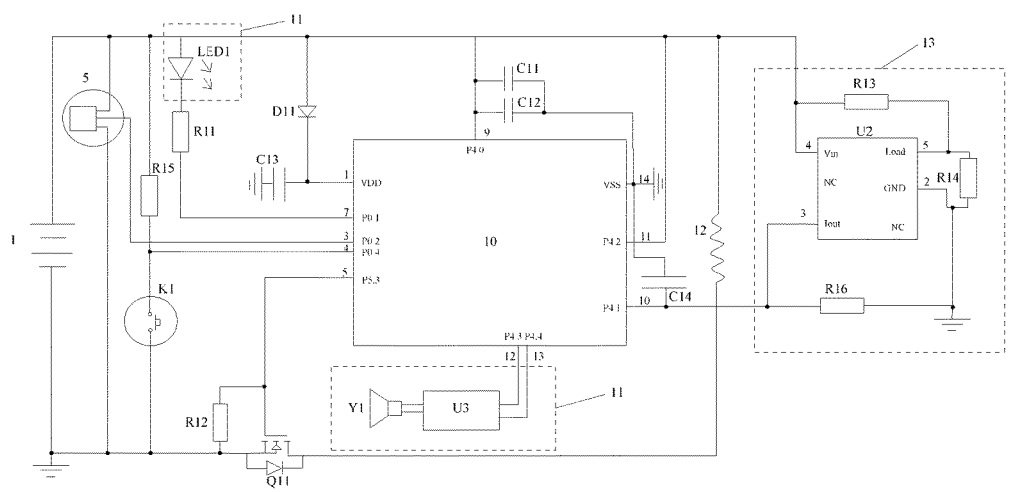
FIG. 7 is a circuit diagram of an electronic cigarette in a fourth embodiment of present invention.

FIG. 7 is a circuit diagram of an electronic cigarette in a fourth embodiment of present invention. The electronic cigarette in the fourth embodiment of present invention, replaces the airflow control element to a sound prompt element on the base of the electronic cigarette in the second embodiment. The sound prompt element comprises a loudspeaker Y1 and a chip U3 with the mode of HT86A72. The two I/O pins of U3 (for example, PC0/AD0 and PC1/AD1 pins) are connected with the twelfth pin and the thirteenth pin of the microcontroller respectively. The audio output pin of U3 is connected with the loudspeaker Y1. Thus, when the remaining capacity of the electronic cigarette is lower than the preset value, the microcontroller 10 can control the sound prompt element to transmit a sound charging prompt signal.

In addition, after the power detection module 13 detects that the power supply battery 1 is on a full charge, the microcontroller 10 will control the sound prompt element to conduct a voice prompt, which is convenient for users to know electricity situation and close the charging power supply in time, to avoid damage to the battery.

The electronic cigarette in the fourth embodiment of present invention reminds user to replace the battery or charge, by using a method of voice prompt, which is more direct, obvious and convenient for uses.

Understandably, the circuit diagrams of the electronic cigarettes in the first to fourth embodiments just show some implementations, in addition, the electronic cigarette in embodiments of present invention can further comprise the displaying prompt element (such as the light emitting diode LED1 and LED2), the airflow control element (such as the electromagnet) and the sound prompt element (such as the loudspeaker Y1 and the chip U3), or any combination including them, the implementation of the circuit can be transformed adaptively according to FIG. 4-FIG. 7, it is not limited in present invention.

Figure 8:
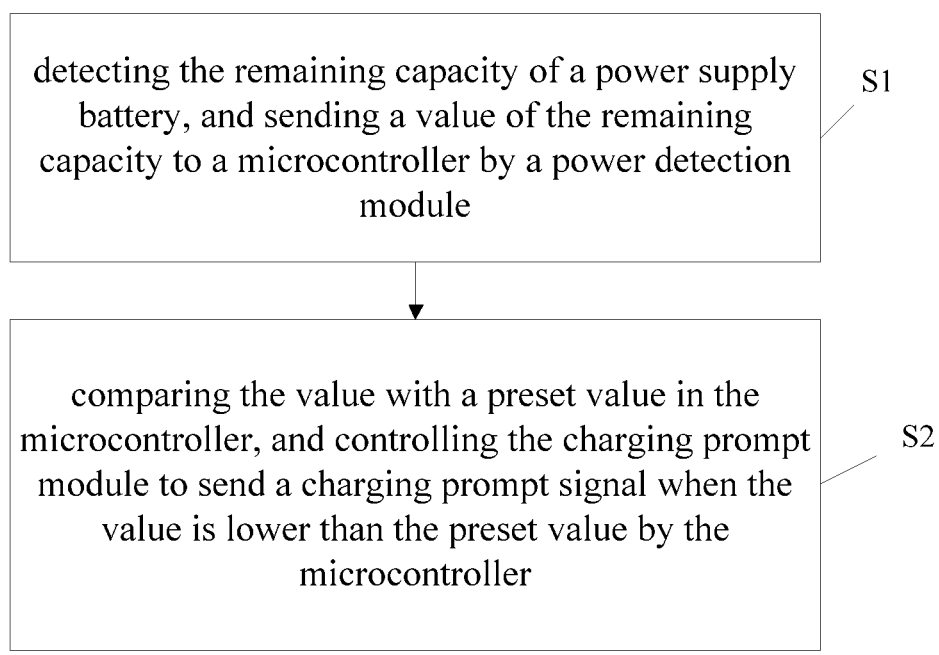
FIG. 8 is a flow diagram of a method for reminding charging for an electronic cigarette in embodiments of present invention.

FIG. 8 is a flow diagram of a method for reminding of charging of an electronic cigarette in embodiments of present invention, the method comprises following steps:

S1, detecting the remaining capacity of the power supply battery of the electronic, and sending the value of the remaining capacity to the microcontroller by the power detection module;

S2, comparing the received value of remaining capacity with a preset value in the microcontroller, and controlling the charging prompt module to send a charging prompt signal when the value of the remaining capacity is lower than the preset value by the microcontroller.

Specifically, the remaining capacity of the power supply battery is detected by the power detection module in step S1. The power detection module can be the chip with the mode of DS2762 or FAN4010.

The charging prompt signal transmitted from the step S2 comprises at least one of the followings: a light charging prompt signal, an airflow charging prompt signal and a voice charging prompt signal. Wherein, the light charging prompt signal can be transmitted by the light emitting diode, the number of the light emitting diode can be one or more, and it can make the color of the emitting light be different. The sound charging prompt signal can be transmitted by the loudspeaker. The airflow charging prompt signal is transmitted by following way: when the value of the remaining capacity is lower than the preset value, and the smoking signal has been received, opening or closing the airflow channel with preset frequency, to transmit an airflow charging prompt signal. Wherein, as shown in FIG. 2 and FIG. 3, an elastic cylinder and an electromagnet are arranged in the electronic cigarette, the method of opening or closing the airflow channel with preset frequency comprises: supplying power to the electromagnet according to the preset frequency, the electromagnet is energized and producing magnetic force to attract the elastic cylinder fitted with the electromagnet, to open or close the airflow channel of the electronic cigarette with preset frequency.

In another embodiment of present invention, a lamp configured for imitating the burning of tobacco when smoking and at the same time used as the displaying prompt element is arranged on the end opposite to the smoking end of the electronic cigarette; when the microcontroller detects a smoking action, the microcontroller controls the lamp to glow continuously for a period of time, meanwhile compares the received value of remaining capacity with a preset value in the microcontroller; when the value of the remaining capacity is lower than the preset value, the microcontroller controls the lamp to glow flickeringly or emit a light of different colors with when smoking.

In addition, the method for reminding of charging of an electronic cigarette in embodiments of present invention further comprises: setting the preset value of the remaining capacity. Specifically, it can set the preset value by setting key in the electronic cigarette.

In one embodiment of present invention, in order to save energy, only when microcontroller has detected a smoking action, then compares the received value of the remaining capacity with a preset value in the microcontroller. As a result, the electric quantity reminding can also be realized by other components without keys, which is intelligent, cost savings, and according with the use habit of user.

Understandably, the operating principle of the method for reminding of charging of an electronic cigarette in embodiments of present invention is corresponding with the electronic cigarette above-mentioned, it is not described more here.

The electronic cigarette and the method for reminding of charging of an electronic cigarette in embodiments of present invention, can remind a user of insufficient remaining capacity of a power supply battery by using airflow, light and sound in time, to make it easy for a user to replace a power supply battery or charge same in time and to effectively avoid the situation where a user cannot use an electronic cigarette due to the fact that the power capacity of a power supply battery thereof is used up; can give a user intuitive prompt by quantizing the remaining number of puffs, to help a user reasonably arrange electronic cigarette charging; can achieve intelligent reminding; can reduce the cost through a lamp configured for imitating the burning of tobacco and at the same time used as the displaying prompt element; and can timely prompt a user the supply battery is fully charged when charging by using light and sound.

Understandably, the selection of the chip and the corresponding circuit connection are merely schematic, the mode of the chip and the circuit connection way can also be other forms.

While the present invention has been described with reference to preferred embodiments above, however the present invention is not limited to above-mentioned embodiments, those modifications, improvements and equivalent substitutions, which don't depart from the scope of the spirit and the principle of the present invention, should be included within the scope of the present invention.

What is claimed is:

1. An electronic cigarette, comprising: a microcontroller (10), a charging prompt module (11), a power detection module (13) and a power supply battery (1);

wherein the power detection module (13) is configured for detecting remaining capacity of the power supply battery (1), and sending a value of the remaining capacity to the microcontroller (10);

the microcontroller (10) is configured for comparing the value with a preset value in the microcontroller, and controlling the charging prompt module (11) to send a charging prompt signal when the value is lower than the preset value;

wherein the charging prompt module (11) comprises the airflow control element;

when the value is lower than the preset value, and a smoking signal has been received, the microcontroller (10) is further configured for controlling the airflow control element to open or close an airflow channel with preset frequency to transmit an airflow charging prompt signal.

2. The electronic cigarette according to claim 1, wherein the microcontroller (10) is further configured for controlling the charging prompt module (11) to prompt the number of remaining puffs supplied by the remaining capacity when the value is lower than the preset value.

3. The electronic cigarette according to claim 1, wherein the airflow control element comprises: an elastic cylinder and an electromagnet;

when the value is lower than the preset value, and the smoking signal has been received, the microcontroller (10) supplies power to the electromagnet according to an preset electrifying period, the electromagnet attracts the elastic cylinder by producing magnetic force, to make the airflow control element open or close the airflow channel with the preset frequency to transmit the airflow charging prompt signal.

4. The electronic cigarette according to claim 3, wherein the electronic cigarette further comprises an electronic cigarette body (8), a fixed sleeve (4) arranged on the electronic cigarette body (8);

wherein the fixed sleeve (4) is respectively provided with an axial through hole (7), a first radial mounting position (41) and a second radial mounting position (42), the first radial mounting position (41) and the second radial mounting position (42) are communicated with the axial through hole (7) respectively, and the first radial mounting position (41) and the second radial mounting position (42) are arranged correspondingly; the elastic cylinder is arranged movably in the first radial mounting position (41), and the electromagnet is arranged in the second radial mounting position (42).

5. The electronic cigarette according to claim 4, wherein the axial through hole (7) forms the airflow channel;

the elastic cylinder comprises an abutting part (3) arranged in the first radial mounting position (41) and configured for closing or opening the airflow channel, and a spring (31) configured for supplying elastic force to the abutting part (3) to reposition the abutting part (3);

when the microcontroller (10) supplies power to the electromagnet, the electromagnet attracts the abutting part (3), the abutting part (3) moves towards the electromagnet (2) and abuts the electromagnet (2) to close the airflow channel;

when the microcontroller (10) disconnects the power to the electromagnet (2), the abutting part (3) moves towards the opposite to the electromagnet (2) and is repositted to open the airflow channel.

6. A method for reminding charging for an electronic cigarette, wherein comprises following steps:

detecting the remaining capacity of a power supply battery, and sending a value of the remaining capacity to a microcontroller by a power detection module;

comparing the value with a preset value in the microcontroller, and controlling the charging prompt module to send a charging prompt signal when the value is lower than the preset value by the microcontrollers;

wherein the charging prompt signal comprises an airflow charging prompt signal;

the airflow charging prompt signal is transmitted by following way:

opening or closing an airflow channel with an preset frequency to transmit the airflow charging prompt signal, when the value is lower than the preset value, and a smoking signal has been received;

wherein the method of opening or closing the airflow channel with the preset frequency comprises:

supplying power to an electromagnet according to the preset frequency, the electromagnet is energized and producing magnetic force to attract an elastic cylinder fitted with the electromagnet, to open or close the airflow channel of the electronic cigarette with the preset frequency.

7. The method for reminding charging for the electronic cigarette according to claim 6, wherein the microcontroller (10) further controls the charging prompt module (11) to prompt the number of remaining puffs supplied by the remaining capacity when the value is lower than the preset value.

8. A method for reminding charging for an electronic cigarette, wherein comprises following steps:

detecting the remaining capacity of a power supply battery, and sending a value of the remaining capacity to a microcontroller by a power detection module;

comparing the value with a preset value in the microcontroller, and controlling the charging prompt module to send a charging prompt signal when the value is lower than the preset value by the microcontroller;

wherein a lamp is arranged on one end opposite to smoking end of the electronic cigarette, which simulates burning of tobacco when smoking and uses as the displaying prompt element at the same time;

when a smoking action is detected by the microcontroller, the microcontroller further controls the lamp to glow continuously for a period of time, meanwhile compares the value with the preset value; when the value is lower than the preset value, the microcontroller further controls the lamp to glow flickeringly or emit a light of different color when smoking.

* * * * *